(12) United States Patent
Tenbrack et al.

(10) Patent No.: US 6,502,486 B1
(45) Date of Patent: Jan. 7, 2003

(54) METHOD FOR PRODUCING STEEL ROLLING BEARING RINGS

(75) Inventors: Karl Tenbrack, Sprockhövel (DE); Wilfried Förster, Gröditz (DE); Roland Stephan, Riesa (DE); Herbert Sommerfeld, Ahrensburg (DE)

(73) Assignee: Zannesmann AG, Düsseldorf (DE)

( * ) Notice: Subject to any disclaimer, the term of this patent is extended or adjusted under 35 U.S.C. 154(b) by 0 days.

(21) Appl. No.: 09/485,149

(22) PCT Filed: Jul. 1, 1998

(86) PCT No.: PCT/DE98/01899

§ 371 (c)(1),
(2), (4) Date: Feb. 4, 2000

(87) PCT Pub. No.: WO99/07495

PCT Pub. Date: Feb. 18, 1999

(30) Foreign Application Priority Data

Aug. 4, 1997 (DE) .......................................... 197 34 563

(51) Int. Cl.$^7$ ............................ B21D 53/00; B23P 11/00
(52) U.S. Cl. .................................. 82/1.11; 82/46; 82/47
(58) Field of Search ............................... 82/1.11, 46, 47, 82/113; 29/898.066, DIG. 32, DIG. 26, DIG. 18; 148/537

(56) References Cited

U.S. PATENT DOCUMENTS

| 3,685,339 A | * | 8/1972 | Goguta .......................... 72/354 |
| 4,302,958 A | * | 12/1981 | Andriessen et al. ........... 82/56 |
| 4,612,789 A | * | 9/1986 | Andriessen ..................... 72/71 |
| 5,868,050 A | * | 2/1999 | Feldmeier ....................... 82/47 |
| 5,894,771 A | * | 4/1999 | Bruan et al. .................... 82/47 |
| 6,101,910 A | * | 8/2000 | Nicolai et al. ................. 82/101 |

* cited by examiner

Primary Examiner—Henry Tsai
(74) Attorney, Agent, or Firm—Cohen, Pontani, Lieberman & Pavane

(57) ABSTRACT

A method for producing steel rolling bearing rings, starting from a hot-rolled tube, the structure of which is similar to a spheroidized structure and from which rings of the same continuous length are hot-cut while supplying a lubricant and, after cooling, are further processed. The hot-cutting takes place at a temperature below the transformation temperature of the rolling bearing steel used but above 720° C., with subsequent cooling in static air. From the blank ring a green or soft ring of a rolling bearing ring is produced with narrow tolerances of its shaped elements by an optimally timed multistage machining type of cold further processing operation, the main element of the cold further processing being a turning operation.

26 Claims, 4 Drawing Sheets

METHOD FOR PRODUCING STEEL ROLLING BEARING RINGS

PRIORITY CLAIM

This is a U.S. national stage of application No. PCT/DE98/01899, filed on Jul. 1, 1998, Country: Germany. 197 34 563.8 filed Aug. 4, 1997. Priority is claimed on these applications.

BACKGROUND OF THE INVENTION

1. Field of the Invention

The invention relates to a method for producing steel rolling bearing rings.

2. Discussion of the Prior Art

The material with the DIN designation 100 Cr 6 and corresponding grades of steel conforming to other standards and sets of regulations from which rolling bearing rings are predominantly produced in Europe as a starting product for rolling bearings are classified as hypereutectic steels because of the high carbon content. For producing a hot-fabricated tube as a starting material for the production of individual rolling bearing rings, the following methods are used.

Starting with pig iron, an ingot is cast by means of the LD steel plant and a ladle furnace as well as a ladle A degassing facility or, alternatively, starting from an E steel plant, a ladle furnace and a ladle degassing facility and, in special cases, by means of a re-melting steel plant, and is rolled on a cogging train into a tube billet. This tube billet is preferably formed into a hot-fabricated tube by means of the Assel method (see in this respect Stahlrohr-Handbuch [steel tube manual], 10th edition, Vulkan-Verlag, Essen 1986, pages 141–143). The Assel train usually has a rotary hearth kiln as the heating installation, which is followed by a piercing apparatus, in the form of a cross-rolling mill, for producing a hollow body. This hollow body is fed to an Assel mill, comprising three inclined rolls which are arranged in uniform distribution around the circumference and are provided with a shoulder calibration. After drawing out the rod serving as an internal mold, the intermediate tube is subsequently heated and the hot-fabricated tube is produced by means of a multistand reducing mill and a downstream sizing mill.

A disadvantage of this method is that the tube billet used must be of similar dimensions to the hot-fabricated tube and a large number of rolled or forged tube billets are required to cover the supply range.

Although the Assel train is the preferred installation for producing rolling bearing tubes, also in use are other tube producing installations, such as push bench installations or continuous tube installations, always using preformed and homogenized feedstock.

Instead of an ingot, it is also known to produce a bloom—predominantly in rectangular format—and to form it into a tube billet by means of a rolling or forging process. Alternatively, instead of a rectangular format, a round bloom is produced, this bloom also being rolled or forged after cutting off (see La Revue de Métallurgie CIT [CIT review of metallurgy], April 1989, pages 344–350). According to the prior art, the degree of forming is chosen such that a degree of forging or degree of rolling of $\lambda=5$ is achieved. The rolling or forging process mentioned is always preceded by a homogenization process, in order to remove or reduce to a great extent the segregations and coarse carbide precipitations caused by the casting process. All the methods mentioned of producing the raw material are costly, since large capital-intensive installations are required for the forming and the material has to be moved several times. Since the stretching processes make it necessary for the bars to be repeatedly divided, a corresponding amount of scrap material also occurs. Each additional working and transporting step means that there is a risk of production being affected by further or compounded errors, the elimination of which increases costs.

In German Patent 37 38 858 it is pointed out that the hot-rolled preliminary tubes are subjected to a spheroidizing long-time annealing operation before their inside and outside diameters are reduced to the desired final dimensions by means of cold pilger rolling or cold drawing, in order to transform the cementite embedded in the structure in lamellar form into globular cementite. However, this long-time annealing causes comparatively thick layers of scale to form on the outer and inner surfaces of the preliminary tubes and the surface zones are severely decarburized. The preliminary tubes are therefore peeled with respect to their outside diameter, removing the outer layers of scale.

Following this peeling, the preliminary tubes are conditioned, i.e. they are pickled, bonderized or greased. After cold pilger rolling or cold drawing, the tubes, known at this stage as rods, are placed into hoppers of a multi-spindle automatic lathe (6 or 8 spindles) and a rolling bearing ring is machined from them. The rings are subsequently heat-treated, i.e. hardened and tempered. Since the rings are oxidized, with the formation of scale, and distorted during this heat treatment, the ring has to be ground to the final dimensions. The rolling bearing producer then carries out the assembly of a rolling bearing by joining together the outer and inner rings, rolling elements and cage or cover plates.

To reduce the production costs in the preliminary stages, it has already been proposed (DE 195 20 833 A1) to feed the continuously cast material to a tube producing installation in the cast state and without heat treatment (homogenization).

A further step in this direction was the elimination of long-time annealing (spheroidizing) by controlled final, rolling in a specific temperature range with predetermined degrees of deformation, which comes very close to TM rolling (DE 195 13 314 A1). As an alternative to the previously known cutting off of the rings in the course of machining cold-pilger-rolled or cold-drawn tubes, a so-called blank ring can be produced by hot-cutting (WO 95/29777). All the proposals made lead to a cost reduction in the production of rolling bearing rings.

SUMMARY OF THE INVENTION

The object of the present invention is to provide a method for producing rolling bearing rings which is based on this known prior art and makes a still further cost reduction possible.

The essence of the invention is the cost-effective use of a hot-fabricated tube as the starting material in conjunction with hot-cutting for producing a blank ring, from which a green or soft ring of a rolling bearing ring, i.e. an outer or inner ring, is produced cost-effectively by means of an efficient form of cold further processing. The main element of the cold further processing is a turning operation which allows high cutting speeds and consequently short cycle times. The cost-intensive production of a cold-pilger-rolled or cold-drawn tube as the starting product for ring production is no longer needed with the method according to the invention, and the same applies to all the associated transporting and handling steps.

Proposed as the optimum sequence is to feed the hot-fabricated tube from the cooling bed to the device for hot-cutting without any further subsequent treatment, in particular without straightening, without heat treatment and without non-destructive testing, and to produce a rolling bearing ring from the blank ring in just one single device with just one re-chucking step by means of an optimally timed multistage turning operation and to test this ring with regard to its dimensions and freedom from defects. To keep down the required amount of machining with a view to short cycle times (<8 sec), the blank ring should come as close as possible to the desired ideal state in its dimensions and its contour. This is not always the case, however, for process-related reasons. For example, the two end faces are not always exactly plane-parallel. Furthermore, formation of burrs toward the inside in the drilling region usually cannot be entirely avoided, since the hot-cutting takes place without any internal support. In view of these circumstances, it has been found to be advantageous for the actual cold further processing to be preceded by a punching and pressing operation and/or partial finish-grinding. Partial finish-grinding in the case of an outer ring comprises grinding the two end faces and/or the circumferential surface of the blank ring to soft ring dimensions. In this way, the multistage turning can take place in an optimum range and tool wear is less. In particular, the preceding finish-grinding of the outer diameter of the blank ring makes it possible to dispense with turning of the outside diameter to the final dimensions and consequently to save a working step which constitutes an increase in the cycle time. Furthermore, in this case only one chucking step is required, so that there is no need for re-chucking. The additional effort of carrying out the preceding punching and pressing operation and/or the partial finish-grinding must be weighed up against the increase in efficiency of the turning operation. Alternatively, the pre-treated blank ring may also be machined on customary lathes with chucking twice. A further useful means for increasing machining efficiency is to supply a lubricant. It has been found to be particularly advantageous for a mixture of compressed air and customary drilling emulsion to be supplied in a pulsed manner. In this connection, in a pulsed manner is intended to mean that the supply takes place only during the actual machining operation and remains switched off during cycle advancement and bringing the tools into position.

The otherwise customary heat treatment of the so-called green or soft ring can be advantageously integrated into the machining process. For example, this heat treatment may be carried out directly after the punching and pressing operation. Another possibility is to carry out the hot-cutting at a temperature above the transformation temperature and to quench the blank ring immediately thereafter, for example letting it drop into a water bath or oil bath. After the subsequent tempering, the blank ring has the hardness required for the rolling bearing. The machining-type cold further processing is then a hard turning operation and/or a hard grinding operation, for which corresponding process technology has recently been developed.

It can be regarded as the advantage of the proposed procedure that, while retaining the cost advantages arising from the direct use of extruded material controlled final rolling of the heat-fabricated and hot-cutting, an additional cost advantage is achieved by the cold further processing adapted to the preliminary stages. The advantages arising from the preliminary stages, such as higher degree of purity, lower surface decarburization, less distortion during the subsequent heat treatment (less finish grinding allowance) and longer service life on account of the fine-grained nature of the structure, which is retained with this method, can be used along with the new advantages, so that a corresponding overall advantage is obtained.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

The production of a rolling bearing ring according to the invention is explained in more detail below on the basis of an example.

Figure 1:
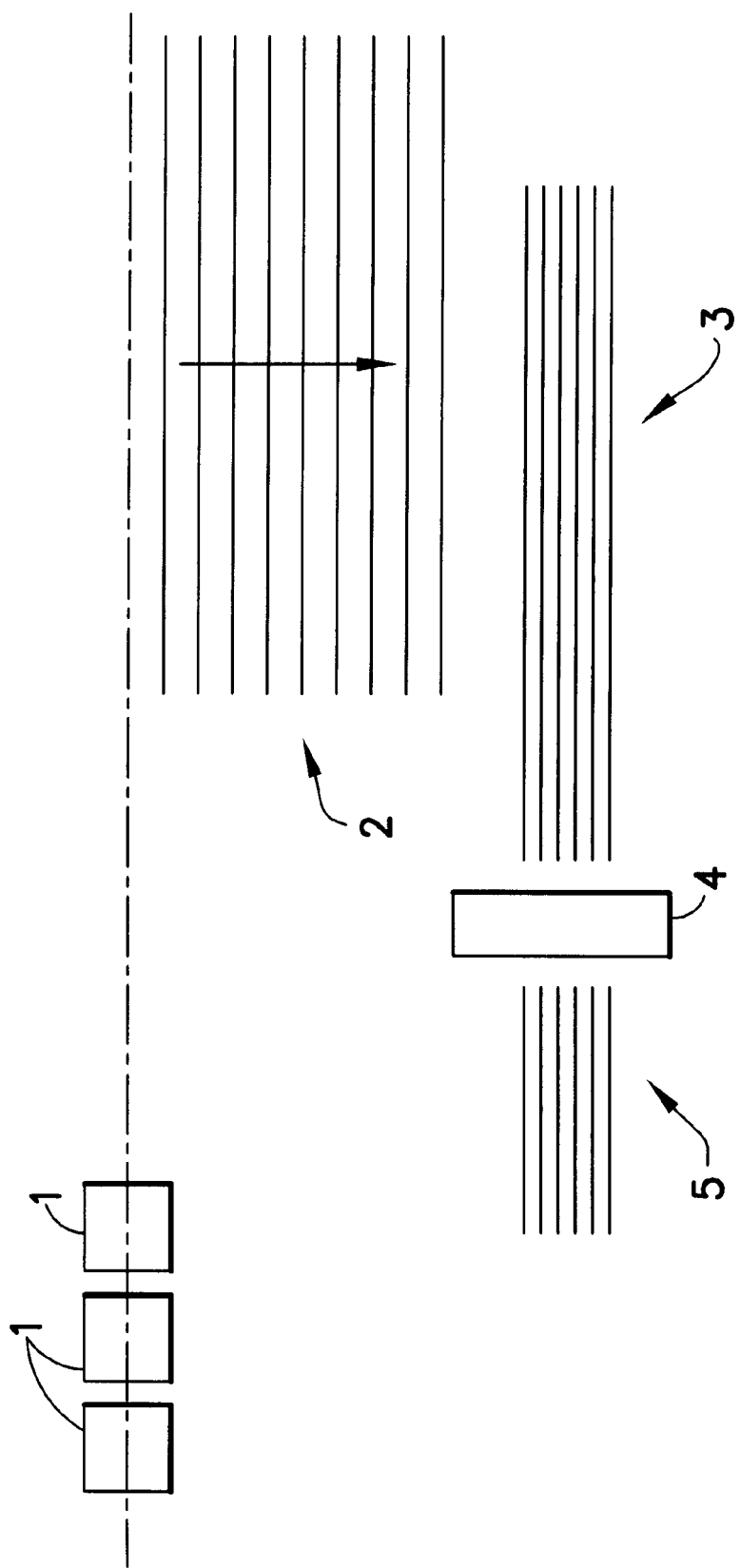
FIG. 1 schematically illustrates finish-rolling of a preliminary tube pursuant to the present invention.

To be produced is an outer ring for the rolling bearing type 6202 (35.2×11.2 mm). The preliminary tube required for this purpose is finish-rolled according to the representation in FIG. 1 as a hot-fabricated tube in the rolling stands 1 of a stretch reducing mill. In view of the production-related tolerances for a hot-finished tube, the nominal dimensions of the preliminary tube are 35.70 mm outside diameter and 3.80 mm wall thickness. Applying the specific production process explained in the introductory part of the description, the tube to be cooled on the cooling bed 2 has the fine-grained pearlitic structure required for the further processing, so that it is possible to dispense with the spheroidizing otherwise required. The tubes, grouped together in layers of tubes 3, are fed to a cold circular saw 4 and bundled in tube lengths 5 of approximately six meters. For the method of production preferably chosen, no further subsequent treatment steps are required on the preliminary tube.

Figure 2:
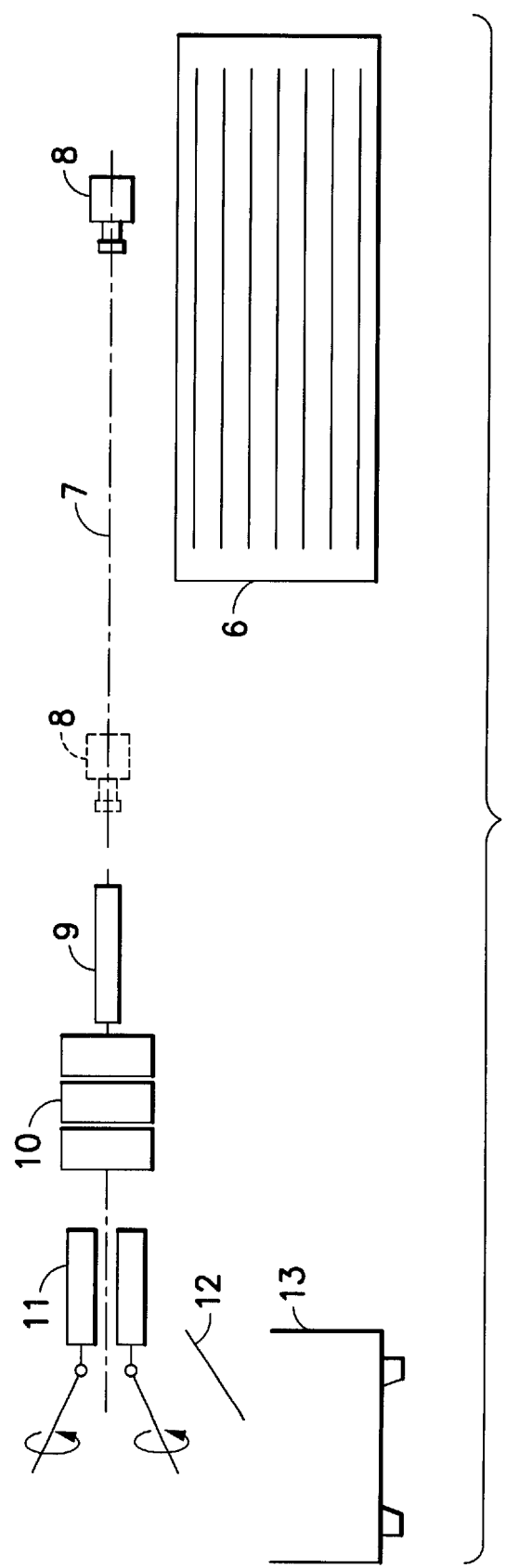
FIG. 2 schematically illustrates feeding of tube bundles to a charge channel.

In a way according to the representation in FIG. 2, the bundles of tubes 5 are fed via a support and individual-separating zone 6 to the charging channel 7. A rotary drive 8 of the hot-cutting device takes up the tube and moves it axially and, just before entering a cutting roll mill 11, additionally with the required rotational speed. In the final position of the rotary drive 8 (identified here by dashed lines), the tube to be cut can be released by the rotary drive 8, since the further process takes place under its own kinematic momentum, so that the rotary drive 8 is returned into the starting position and can take up the next tube.

In the buffer zone 9, the beginning of the next tube is brought up to just in front of the end of the tube already in the cutting process, so that the hot-cutting takes place with the tubes virtually abutting. To reduce the deformation resistance, the tube to be cut is heated to the cutting temperature (>720° C. but <the transformation temperature) by means of an induction heating installation 10. In the actual cutting roll mill 11, the actual cutting process is performed by means of special tools, which are characterized by helically arranged cutting edges of increasing height on the circumferential surface. The blank rings are transported via a run-out slide 12 into a container 13. As an alternative to this, transporting away by means of conveyor belts with simultaneous cooling in static air is possible.

Figure 3:
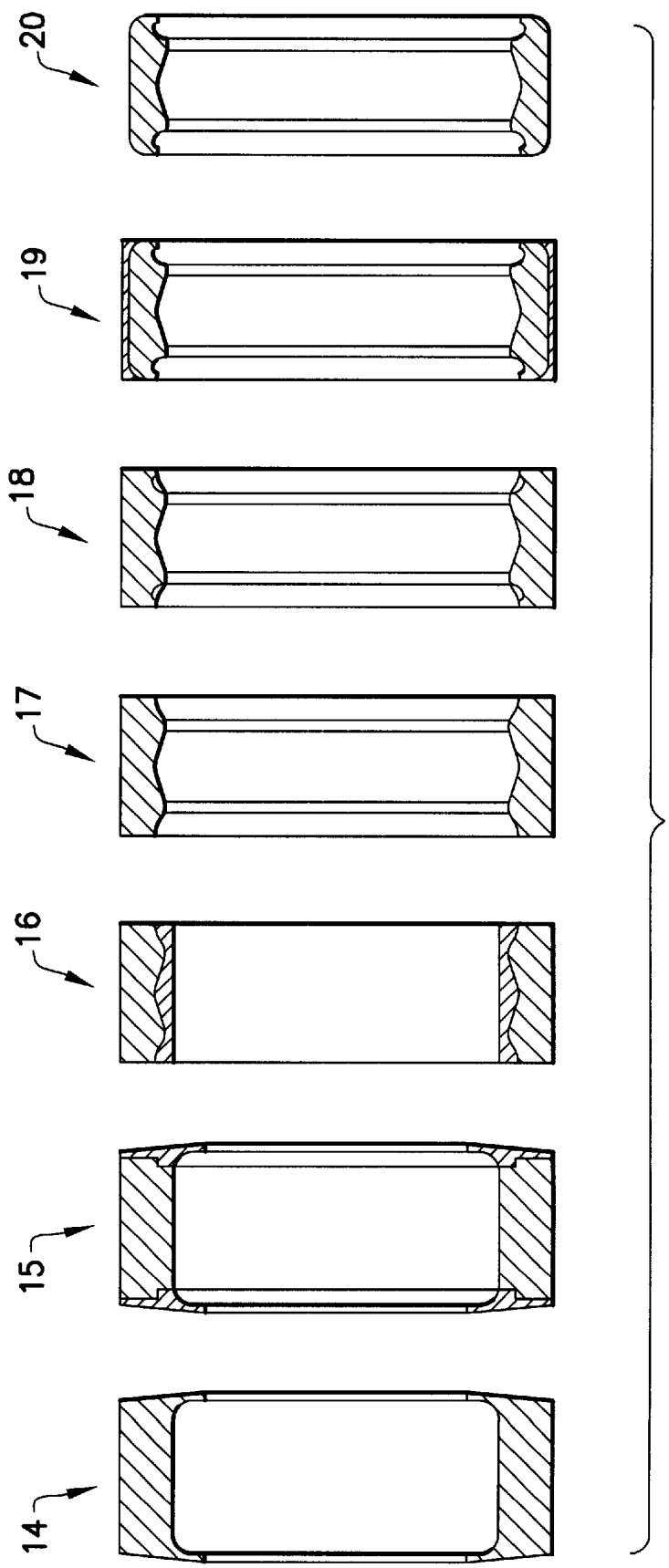
FIG. 3 schematically illustrates a multi-stage turning process for producing the complete roller bearing outer ring.

After they have cooled to room temperature, the blank rings thus obtained are fed to a machine tool, which produces the complete rolling bearing outer ring (soft ring) in a multistage turning process (FIG. 3).

Figure 4:
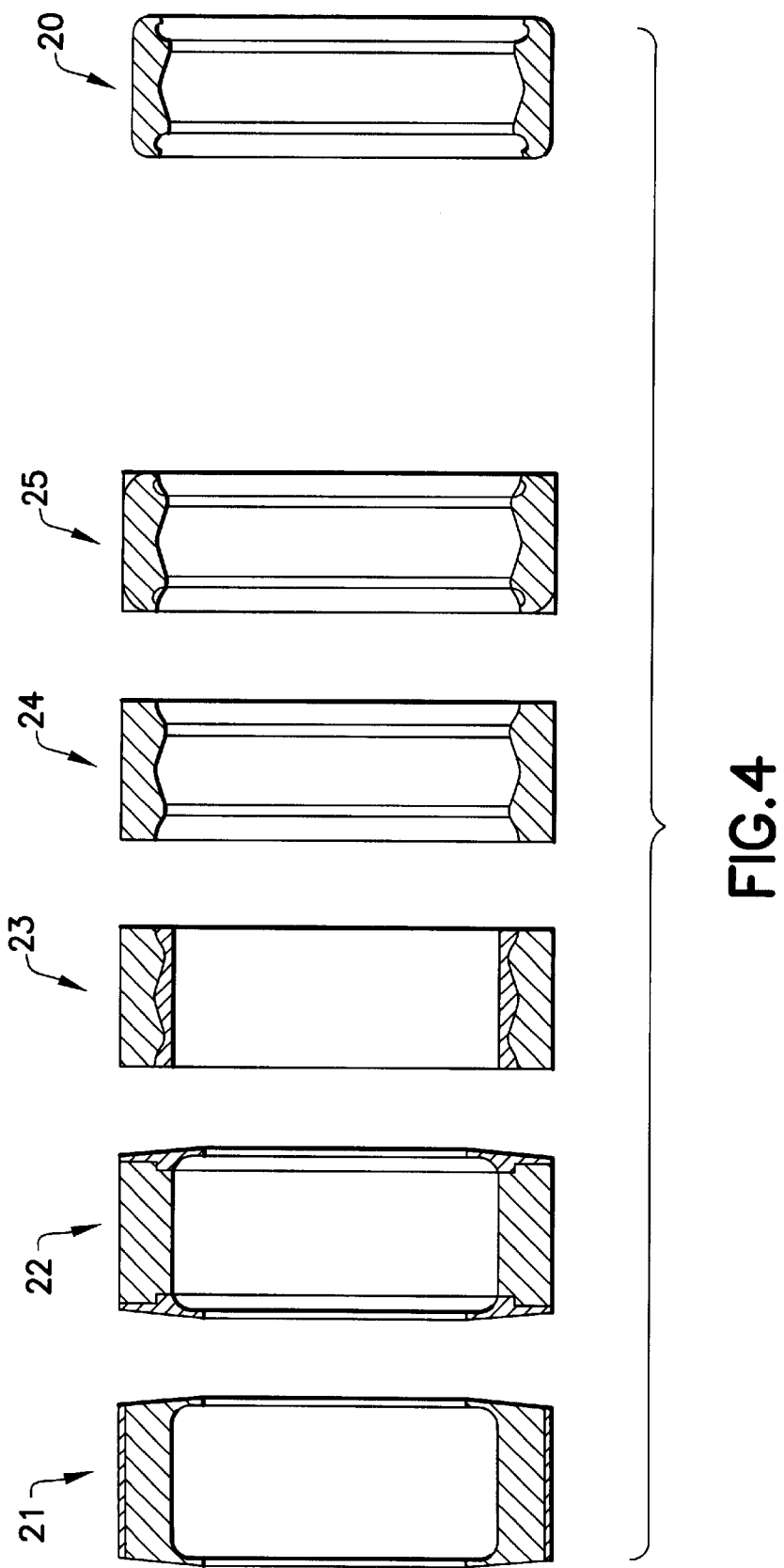
FIG. 4 schematically illustrates a different sequence of steps from FIG. 3.

The following working steps are provided in the lathe:
a) loading 14;
b) simultaneous facing and pre-drilling on both sides 15;
c) following of the inner contour (roughing) 16;
d) following of the inner contour (smoothing) 17
e) simultaneous recessing of the groove on both sides for the cover plate and of the adjacent land 18; and
f) following of the outer contour 19;

In the case of preceding partial finish-grinding of the circumferential surface of the outer ring, a modified sequence of steps is provided (FIG. 4):
a) loading 21;
b) simultaneous facing and pre-drilling on both sides 22;
c) following of the inner contour (roughing) 23;
d) following of the inner contour (smoothing) 24; and
e) simultaneous following of the outer contours on both sides in the region where the edges are shortened and simultaneous recessing of the groove on both sides for the cover plate and of the adjacent land 25.

Thereafter, the machined ring is fed to a measuring station 20, in which a 100% check is carried out on all rings for geometry and freedom from defects. The outer ring (soft ring) thus obtained has as principal dimensions outside diameter 35.2 mm,
inside diameter 29.26 mm, and
width 11.21 mm.

The out-of-roundness of the ring produced in this way is <0.05 mm.

The invention is not limited by the embodiments described above which are presented as examples only but can be modified in various ways within the scope of protection defined by the appended patent claims.

What is claimed is:

1. A method for producing steel rolling bearing rings, comprising the steps of: producing a hot-rolled tube having a structure which is similar to a spheroidized structure by controlled finish-rolling of rolling bearing steel; hot-cutting blank rings of a common continuous length from the tube at a temperature below the transformation temperature of the rolling bearing steel but above 720° C. while supplying a lubricant to the blank rings; cooling the blank rings in static air; and further cold processing each blank ring for producing a green or soft ring of the rolling bearing ring with close tolerance of its shaped elements to final dimensions of the ring by optimized, timed multistage machining, the further cold processing including a turning operation.

2. A method as defined in claim 1, wherein the further cold processing includes, in a first stage, subjecting the blank ring to a combined punching and pressing operation so that the blank ring is thereby calibrated.

3. A method as defined in claim 2, including punching out burrs protruding into a drilling region and exerting a predetermined pressing force on end faces of the ring.

4. A method as defined in claim 2, including pre-profiling the shaped elements of the soft ring by the punching and pressing operation.

5. A method as defined in claim 1, wherein the cold processing includes partial finish grinding at least one of two end faces and a circumferential surface of the blank ring to soft ring dimensions, and machining remaining surfaces with turning operations.

6. A method as defined in claim 2, including a multistage turning operation following the punching and pressing operation, the ring being chucked twice and a cycle time being <8 sec.

7. A method as defined in claim 5, including a multistage turning operation following the partial finish-grinding, the ring being chucked twice and a cycle time being <8 sec.

8. A method as defined in claim 6, wherein the turning operation comprises the following individual steps:
a) first chucking,
cutting a first outer radius and turning a first half of the circumferential surface,
turning an inner contour, and
cutting a groove in a cover plate and an adjacent land; and
b) second chucking,
cutting a second outer radius and turning a second half of the circumferential surface,
tracing the inner contour, and
cutting a second groove in the cover plate and the adjacent land.

9. A method as defined in claim 2, including following the punching and pressing operation in a cycled manner with a multistage turning operation in only one device and with one re-chucking step, the ring being stationary in first stages of the turning operation and the ring being turned in a final stage, and a total cycle time being <8 sec.

10. A method as defined in claim 5, including following the partial finish-grinding in a cycled manner with a multistage turning operation in only one device and with one re-chucking step, the workpiece being stationary in first stages of the turning operation and the workpiece being turned in a final stage, and a total cycle time being <8 sec.

11. A method as defined in claim 5, including following the finish-grinding in a cycled manner with a multistage turning operation in only one device and with only one chucking step, the ring being stationary in all stages of the turning operation and a total cycle time being ≦8 sec.

12. A method as defined in claim 1, subjecting the blank ring directly to a multistage turning operation in only one device and with one re-chucking step, the ring being stationary in first stages of the turning operation and the ring being turned in a final stage, and a total cycle time being <8 sec.

13. A method as defined in claim 12, wherein, for an outer ring, a sequence of the following individual steps is carried out:
a) simultaneous facing and pre-drilling of both end faces;
b) tracing an inner contour of a running surface for roughing the inner contour;
c) tracing the inner contour of the running surface for smoothing the inner contour;
d) simultaneously recessing a groove in a cover plate on both sides and in an adjacent land; and
e) turning the outer contour to final dimensions.

14. A method as defined in claim 11, wherein, for an outer ring with a finish-ground circumferential surface, a sequence of the following individual steps is carried out:

a) simultaneous facing and bolting of both the end faces;
b) tracing an inner contour of a running surface for roughing the inner contour;
c) tracing the inner contour of the running surface for smoothing the inner contour; and
d) simultaneously following outer contours on both sides in a region where edges are shortened and simultaneously recessing a groove in a cover plate on both sides and in an adjacent land.

15. A method as defined in claim 13, wherein machining takes place axially and radially in a concomitant manner in steps b), c), d).

16. A method as defined in claim 14, wherein machining takes place axially and radially in a concomitant manner in steps b), c), d).

17. A method as defined in claim 9, including supplying a lubricant in a pulsed manner only during machining.

18. A method as defined in claim 17, wherein the lubricant is a mixture of compressed air and drilling emulsion, the drilling emulsion being added to the compressed air drop by drop.

19. A method as defined in claim 1, including, after the hot-cutting, heat treating the blank ring and subsequently machining the hardened blank ring.

20. A method as defined in claim 2, including, after the punching and pressing operation, subjecting the blank ring to a heat treatment and subsequently finish-machining the ring.

21. A method as defined in claim 17, wherein the further cold processing is at least one of a hard turning and a hard grinding operation.

22. A method as defined in claim 1, including, after cooling, firstly stress-relief annealing the hot-rolled tubes, then straightening and non-destructively testing the tubes for defects before hot-cutting.

23. A method as defined in claim 22, wherein the step of non-destructively testing the tubes includes ultrasonic testing for longitudinal and transverse defects.

24. A method as defined in claim 1, including, after the further cold processing, subjecting each individual rolling bearing ring to dimensional and non-destructive defect testing.

25. A method as defined in claim 24, wherein the dimensional testing takes place by means of laser and the non-destructive testing takes place by means of one of ultrasound and eddy current.

26. A method as defined in claim 1, including after cooling, firstly stress-relief annealing the hot-rolled tubes, finish machining the rolling bearing rolls and then straightening and subjecting only the finish-machined rolling bearing rolls to dimensional and non-destructive defect testing.

* * * * *

UNITED STATES PATENT AND TRADEMARK OFFICE
CERTIFICATE OF CORRECTION

PATENT NO. : 6,502,486 B1
DATED : January 7, 2003
INVENTOR(S) : Karl Tenbrack

It is certified that error appears in the above-identified patent and that said Letters Patent is hereby corrected as shown below:

<u>Title page,</u>
Item [73], Assignee, should read -- Mannesmann AG, Düsseldorf (DE) --

Signed and Sealed this

Twenty-fourth Day of June, 2003

JAMES E. ROGAN
*Director of the United States Patent and Trademark Office*